United States Patent
Wu

(10) Patent No.: US 10,956,350 B2
(45) Date of Patent: Mar. 23, 2021

(54) ELECTRONIC DEVICE WITH USB TYPE-C CONNECTOR

(71) Applicant: PEGATRON CORPORATION, Taipei (TW)

(72) Inventor: Chi-Yu Wu, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 16/694,191

(22) Filed: Nov. 25, 2019

(65) Prior Publication Data

US 2020/0167306 A1 May 28, 2020

(30) Foreign Application Priority Data

Nov. 26, 2018 (TW) .................................. 107142125

(51) Int. Cl.
*G06F 13/40* (2006.01)
*G06F 13/42* (2006.01)
(Continued)

(52) U.S. Cl.
CPC .......... *G06F 13/4022* (2013.01); *G06F 1/266* (2013.01); *G06F 13/385* (2013.01);
(Continued)

(58) Field of Classification Search
CPC .... G06F 13/4022; G06F 1/266; G06F 13/385; G06F 3/4068; G06F 3/4282; H02J 7/00
See application file for complete search history.

(56) References Cited

U.S. PATENT DOCUMENTS 5,884,086 A * 3/1999 Amoni ................ G06F 1/266
 700/282
7,024,569 B1 * 4/2006 Wright ................ G06F 1/266
 713/300
(Continued)

FOREIGN PATENT DOCUMENTS

CN 106067573 B 2/2019
KR 200330467 Y1 10/2003
(Continued)

OTHER PUBLICATIONS

Korean Office Action dated Jan. 28, 2021, 4 pages.

*Primary Examiner* — Tim T Vo
*Assistant Examiner* — Phong H Dang
(74) *Attorney, Agent, or Firm* — Muncy, Geissler, Olds & Lowe, P.C.

(57) ABSTRACT

The application discloses an electronic device with a USB Type-C connector, which is able to be coupled to another electronic device. The electronic device includes a control unit, a switch unit and a charge conversion unit. The control unit outputs a first control signal according to a result of power supply handshaking between the electronic device and the other electronic device. The state of the first control signal determines whether the other electronic device supplies power to the electronic device. The switch unit is coupled to the control unit, and receives a supply voltage output by the other electronic device, and the switch unit determines whether to output the supply voltage according to the state of the first control signal. The charge conversion unit is coupled to the switch unit. The charge conversion unit converts the supply voltage into a target voltage to supply power to the electronic device.

9 Claims, 3 Drawing Sheets

(51) Int. Cl.
*G06F 1/26* (2006.01)
*G06F 13/38* (2006.01)
*H02J 7/00* (2006.01)

(52) U.S. Cl.
CPC ...... *G06F 13/4068* (2013.01); *G06F 13/4282* (2013.01); *H02J 7/00* (2013.01); *H02J 7/00034* (2020.01); *H02J 2207/20* (2020.01)

(56) References Cited

U.S. PATENT DOCUMENTS

| | | |
|---|---|---|
| 9,755,449 B2 | 9/2017 | Nge et al. |
| 10,250,059 B2 * | 4/2019 | Aldehayyat ......... H02M 3/1582 |
| 2016/0094071 A1 * | 3/2016 | Nge .................... G06F 13/4022 |
| | | 320/107 |
| 2018/0175628 A1 * | 6/2018 | Chou .................... H02J 7/0068 |
| 2019/0236040 A1 * | 8/2019 | Armstrong ........... H01R 31/065 |
| 2020/0110724 A1 * | 4/2020 | Liu ..................... G06F 13/4022 |

FOREIGN PATENT DOCUMENTS

| | | |
|---|---|---|
| KR | 20140113904 A | 9/2014 |
| KR | 20180044602 A | 5/2018 |
| TW | I587124 B | 6/2017 |
| TW | I641239 B | 11/2018 |

* cited by examiner

ELECTRONIC DEVICE WITH USB TYPE-C CONNECTOR

CROSS-REFERENCE TO RELATED APPLICATION

This non-provisional application claims priority under 35 U.S.C. § 119(a) to Patent Application No. 107142125 filed in Taiwan, R.O.C. on Nov. 26, 2018, the entire contents of which are hereby incorporated by reference.

BACKGROUND

Technical Field

The application relates to an electronic device, and more particularly relates to an electronic device with a USB Type-C connector.

Related Art

Since a USB interface has a hot-swapping characteristic and may provide a stable power output, many electronic devices demanding less power, such as a smart mobile device, an MP3 player and a set top box, have abandoned a traditional DC-Jack, and directly use a USB connector for power delivery.

In recent years, a USB development organization has developed a new USB Type-C connection interface for the USB 3.1 specification. Furthermore, in order to supply enough power to electronic devices (for example a tablet, a notebook computer and even a desktop computer) demanding relatively high power through the USB Type-C connection interface.

The USB development organization has also developed a new generation of USB Power Delivery (USB PD) specification to respond to the electronic devices demanding relatively high power.

A traditional electronic device that supports the USB PD specification can support an input value of a specific voltage such as 5 V or 20 V or the like. However, an electronic device that can support only a specific voltage input obviously does not meet future usage requirements in response to more and more kinds and styles of electronic devices in the future.

SUMMARY

In view of the above, the objective of the application is to provide an electronic device with a USB Type-C connector. Compared with a conventional electronic device, the application may be suitable for inputting any voltage value within a voltage varying range, and is not limited to certain specific voltage values. Therefore, the electronic device of the application is relatively high in applicability and application flexibility and meets future usage requirements.

In order to achieve the above objective, the electronic device with the USB Type-C connector according to the application is able to be coupled to another electronic device with a USB Type-C connector. The electronic device includes a control unit, a switch unit and a charge conversion unit. The control unit outputs a first control signal according to a result of power supply handshaking between the electronic device and the other electronic device. The state of the first control signal determines whether the other electronic device supplies power to the electronic device. The switch unit is coupled to the control unit. The switch unit receives a supply voltage output by the other electronic device, the switch unit determines whether to output the supply voltage according to the state of the first control signal, and the switch unit outputs the supply voltage when the state of the first control signal is enabling the switch unit. The charge conversion unit is coupled to the switch unit.

The charge conversion unit converts the supply voltage into a target voltage to supply power to the electronic device.

In one embodiment, the control unit receives a power delivery packet output by the other electronic device to determine the result of power supply handshaking.

In one embodiment, when the electronic device acquires, according to the result of power supply handshaking, information that the other electronic device is unable to supply power, the state of the first control signal output by the control unit is disabling the switch unit, so that the switch unit is unable to output the supply voltage to the charge conversion unit.

In one embodiment, the electronic device further includes a system power unit and a switch selection unit. The system power unit is coupled to the charge conversion unit. When the other electronic device supplies power to the electronic device, the target voltage is transmitted to the system power unit. The switch selection unit is coupled to the charge conversion unit and the control unit. The control unit further outputs a second control signal according to the result of power supply handshaking between the electronic device and the other electronic device. The state of the second control signal determines whether the electronic device supplies power to the other electronic device. The system power unit is able to provide a first voltage, and the charge conversion unit outputs the first voltage to the switch selection unit.

In one embodiment, a withstand voltage value of the switch selection unit is greater than or equal to the supply voltage.

In one embodiment, the system power unit is able to provide a second voltage to the switch selection unit, and when the electronic device acquires, according to the result of power supply handshaking, information that the other electronic device may receive power, the state of the second control signal output by the control unit is enabling the switch selection unit, so that the switch selection unit outputs the first voltage or the second voltage according to the second control signal to supply power to the other electronic device.

In one embodiment, when the electronic device acquires, according to the result of power supply handshaking, information that the other electronic device is unable to receive power, the state of the second control signal output by the control unit is disabling the switch selection unit, so that the switch selection unit does not output a voltage and supply power to the other electronic device according to the second control signal.

In one embodiment, a withstand voltage value of the switch selection unit is greater than or equal to the first voltage and the second voltage.

In one embodiment, the first voltage is greater than the second voltage, the first voltage is a fast charge voltage, obtained by the power supply handshaking between the electronic device and the other electronic device, of the other electronic device, and the second voltage is a normal charge voltage of the other electronic device.

In one embodiment, when the state of the first control signal is enabling the switch unit to output the supply voltage, the state of the second control signal is disabling the switch selection unit, s as not to output a voltage and supply power to the other electronic device.

In one embodiment, the supply voltage is any voltage value in a range from 5 V to 20 V.

Based on the above, in addition to the data and signal delivery with the other electronic device, the electronic device with the USB C-type connector of the application also may receive a non-specific supply voltage transmitted by the other electronic device according to the result of power supply handshaking and convert the non-specific supply voltage into a desired target voltage value for power delivery for the use by a system of the electronic device. Therefore, compared with the conventional electronic device with the USB Type-C connector, the electronic device of the application is not limited to certain specific voltage values, and thus is relatively high in applicability and application flexibility and meets the future usage requirements.

In some embodiments, the electronic device of the application may perform a general charge function on the other electronic device at the relatively low second voltage, or charge the other electronic device at the relatively high first voltage, so as to achieve a fast charge purpose.

DETAILED DESCRIPTION OF THE EMBODIMENTS

Figure 1:
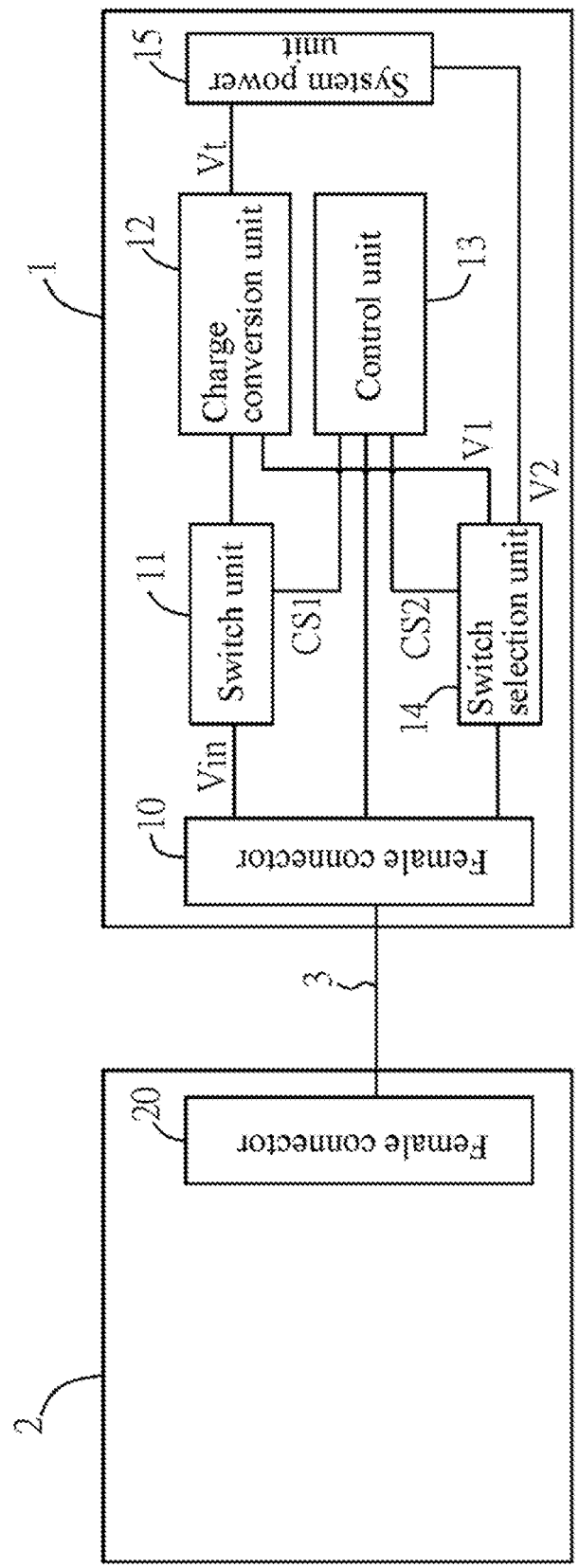
FIG. 1 is a function block schematic diagram of connection between an electronic device with a USB Type-C connector and another electronic device according to one embodiment of the application.

An electronic device with a USB Type-C connector according to the embodiment of the application will be described below with reference to relevant drawings, and identical elements will be described with identical reference numerals.

The USB Type-C connector mentioned in the following embodiments conforms to the USB Power Delivery (USB PD) specification and may adopt a USB 2.0 Type-C, USB 3.0 Type-C or USB 3.1 Type-C connection interface or another type of USB Type-C connection interface, and there is no particular limitation.

FIG. 1 is a function block schematic diagram of connection between an electronic device with a USB Type-C connector and another electronic device according to one embodiment of the application.

As shown in FIG. 1, an electronic device 1 and an electronic device 2 may be, for example but not limited to, notebook computers, display screens, mobile phones, mobile power banks, tablets, desktop computers, or satellite navigators, or other electronic devices with USB Type-C connectors. Hereof, the electronic device 1 and the electronic device 2 are connected to each other by a USB Type-C connector (connection interface) that supports the USB PD. Specifically, both the electronic device 1 and the electronic device 2 are electronic equipment conforming to the USB PD specification, and are coupled to each other through a connecting wire 3 (a USB Type-C connecting wire). Two ends of the connecting wire 3 may each have a USB Type-C male connector (not illustrated), and the two male connectors may be correspondingly connected to (inserted into) USB Type-C female connectors 10, 20 of the electronic devices 1, 2. Of course, the USB Type-C female connectors 10, 20 and the USB Type-C male connectors all support the USB PD specification. After a configuration channel pin (CC pin) in the USB Type-C male connector senses another CC pin in the USB Type-C female connector 10, 20, the electronic device 2 may supply power to the electronic device 1 through another pin in the connector; or, the electronic device 1 may supply power to the electronic device 2 through another pin in the connector. Of course, the electronic device 1 and the electronic device 2 also may transmit data, files or signals through another pin of the USB Type-C connector. As shown in FIG. 1, the electronic device 1 includes a switch unit 11, a charge conversion unit 12 and a control unit 13. In addition, the electronic device 1 of the embodiment further may include a switch selection unit 14 and a system power unit 15.

The control unit 13 is coupled to the switch unit 11 and may output a first control signal CS1 according to a result of power supply handshaking between the electronic device 1 and the electronic device 2. Hereof, when the electronic device 1 and the electronic device 2 are coupled through the connecting wire 3, and after the control unit 13 receives a power delivery packet output by the electronic device 2 to determine the result of power supply handshaking, the switch unit 11 may receive a supply voltage Vin output by the electronic device 2 through the USB Type-C connector, and the switch unit 11 may determine whether the electronic device 2 may output the supply voltage Vin to the electronic device 1 according to the state of the first control signal CS1 output by the control unit 13. Furthermore, when the state of the first control signal CS1 is enabling the switch unit 11, the switch unit 11 may output the supply voltage Vin. Hereof, the supply voltage Vin may be any voltage value within a voltage varying range.

The charge conversion unit 12 is coupled to the switch unit 11, and the system power unit 15 is coupled to the charge conversion unit 12 and the switch selection unit 14. The charge conversion unit 12 may convert the supply voltage Vin to a target voltage Vt and input the target voltage Vt into the system power unit 15 for the use by a system of the electronic device 1. Hereof, the target voltage Vt may be a direct current voltage desired by the system of the electronic device 1 (for example, a working voltage of the electronic device 1), while the system power unit 15 may include, for example but not limited to, a battery (pack) or an integrated circuit (IC) chip. In some embodiments, the target voltage Vt also may charge a power storage unit (such as the battery) of the system power unit 15 in addition to being supplied to the system of the electronic device 1 for use. In some embodiments, the target voltage Vt may be, for example but not limited to, 8 V, or another voltage value.

The control unit 13 is coupled to the switch selection unit 14. The control unit 13 may determine the state of the first control signal CS1 according to the result of power supply handshaking with the electronic device 2, and the state of the first control signal CS1 may determine whether the switch unit 11 outputs the supply voltage Vin. In other words, the state of the first control signal CS1 generated by the result of handshaking is used to determine whether the electronic device 2 may supply power to the electronic device 1. The called "handshaking" herein means that before an information exchange process, two electronic devices or systems need to communicate with each other according to the same handshake protocol, so as to establish a connection, cut off a connection or exchange data and states, etc. by an operation process of an predetermined control signal or control character sequence. In other words, before establishment of a communication connection and delivery, the two electronic devices or systems must perform a handshaking action, and may start data or power delivery only after they confirm each other.

Specifically, both the electronic device 1 and the electronic device 2 are the electronic equipment conforming to the USB PD specification, so that when the two electronic devices are electrically connected to each other through the USB Type-C connectors, and before the establishment of communication or power delivery, the two electronic devices 1, 2 may perform the handshaking action at first so as to determine a subsequent action to be performed according to the result of handshaking. In some embodiments, if the control unit 13 of the electronic device 1 acquires that the electronic device 2 may supply power (the control unit 13 also acquires a voltage value of power that may be supplied by the electronic device 2) after the power supply handshaking action, the state of the output first control signal CS may enable the switch unit 11, so that the switch unit 11 may output the supply voltage Vin to the charge conversion unit 12, so as to convert the supply voltage Vin to the target voltage Vt desired by the electronic device 1 via the charge conversion unit 12 and supply the target voltage Vt to the system power unit 15. Of course, if the electronic device 1 acquires that the electronic device 2 is unable to supply power after the power supply handshaking action, the state of the output first control signal CS1 may disable the switch unit 11, so that the switch unit 11 is unable to output the supply voltage Vin to the charge conversion unit 12. In some embodiments, the supply voltage Vin may be, for example but not limited to, 5 V, 9 V, 10.5 V, 12 V, 13.8 V, 15 V, 18 V, or 20 V, or another voltage value. In other words, the voltage value that may be accepted by the switch unit 11 is within a certain voltage varying range, for example, any voltage value between 5 V and 20 V, and is not limited to certain specific values. Therefore, in addition to certain specific voltage inputs at present, the electronic device is not limited to specific values such as 5V or 20V specified by the USB Type-C charging standard, and thus is extremely high in applicability and application flexibility.

The foregoing switch unit 11 may include, for example, a direct current (DC) power switch, and the charge conversion unit 12 may include a charge IC and a voltage raising/reducing circuit which may raise/reduce any voltage value within a certain voltage varying range to the target voltage Vt and then output the target voltage Vt. In other words, the charge conversion unit 12 of the embodiment does not just have a general fixed voltage raising or reducing circuit, but is a varying voltage conversion unit that may automatically raise the supply voltage Vin less than the target voltage Vt to the target voltage Vt, or reduce the supply voltage Vin greater than the target voltage Vt to the target voltage Vt, in response to the input voltage through the charge IC, so as to supply the target voltage Vt to the electronic device 1 for use. In addition, the control unit 13 may include control hardware (for example, a control chip), software and/or firmware, etc., and have a handshake with a controller of the electronic device 2 to generate a corresponding control action. Moreover, in addition to the foregoing elements, the electronic device 1 of course also may include other elements or units, for example, a processing unit (including a central processing unit (CPU)), a display screen, application software, a memory, a keyboard, a touch panel, a display card and/or a housing, etc. (not shown in FIG. 1), and is not limited thereto.

In addition, the charge conversion unit 12 of the embodiment may further output a first voltage V1 and transmit the first voltage V1 to the switch selection unit 14. The system power unit 15 may further output a second voltage V2 and transmit the second voltage V2 to the switch selection unit 14. The switch selection unit 14 may determine whether to output the first voltage V1 or the second voltage V2 to the electronic device 2 according to the state of a second control signal CS2 output by the control unit 13, so as to supply power to the electronic device 2. Both the first voltage V1 and the second voltage V2 are from the system power unit 15, and the first voltage V1 is greater than the second voltage V2. In some embodiments, the first voltage V1 may be, for example but not limited to, 9 V, or another direct current voltage greater than the second voltage V2 (for example 5 V). In other words, the foregoing charge conversion unit 12 may further output the first voltage V1 to the switch selection unit 14 in addition to converting the supply voltage Vin to the target voltage Vt, and the system power unit 15 may output the second voltage V2 to the switch selection unit 14. Furthermore, the control unit 13 may further output the second control signal CS2 according to the result of power supply handshaking between the electronic device 1 and the electronic device 2. The state of the second control signal CS2 may determine whether the electronic device 1 may supply power to the electronic device 2. When the electronic device 1 acquires information that the electronic device 2 may receive power according to the result of power supply handshaking, the state of the second control signal CS2 output by the control unit 13 is enabling the switch selection unit 14, so that the switch selection unit 14 outputs the first voltage V1 or the second voltage V2 according to the second control signal CS2 to supply power to the electronic device 2. When the electronic device 1 acquires information that the electronic device 2 is unable to receive power according to the result of power supply handshaking, the state of the second control signal CS2 output by the control unit 13 is disabling the switch selection unit 14, so that the switch selection unit 14 does not output a voltage according to the second control signal CS2 and not supply power to the electronic device 2. Hereof, the switch selection unit 14 may include, for example, two DC power switches, and the second control signal CS2 may be input into the two DC power switches to conduct (turn on) one of the DC power switches, so that one of the first voltage V1 and the second voltage V2 may be output to the electronic device 2 through the correspondingly conducted DC power switch; or, the second control signal CS2 also may turn off the two DC power switches, so that the switch selection unit 14 is unable to output power and supply to the electronic device 2.

Specifically, as mentioned above, when the electronic device 1 and the electronic device 2 are connected to each other, and before establishment of the communication or power delivery, the two electronic devices 1, 2 may perform the power supply handshaking action at first to determine the subsequent action to be performed. In some embodiments, after the power supply handshaking action, if the control unit 13 of the electronic device 1 acquires that the electronic device 2 requires power supply, and at the moment, the control unit 13 also acquires a voltage value to be supplied (the electronic device 2 may be possibly burnt out if the supply voltage is too high) during handshaking, the second control signal CS2 may be output to control the switch selection unit 14 to output the first voltage V1 or the second voltage V2, that is suitable for charging the electronic device 2, to the electronic device 2. Therefore, in addition to raising or reducing a voltage of a certain voltage varying range (for example, between 5 V and 20 V) to the target voltage Vt desired by the electronic device 1, the charge conversion unit 12 may further output the first voltage V1 greater than the second voltage V2 to the switch selection unit 14, to achieve a fast charge purpose of the electronic device 2.

For example, in some embodiments, if a normal charge voltage of the electronic device 2 is, for example, 5 V, and the control unit 13 of the electronic device 1 acquires, via the handshaking, that the bearable charge voltage of the electronic device 2 is only 5 V, the second control signal CS2 may enable the switch selection unit 14 to output the second voltage V2 (5 V) to the electronic device 2 to charge (normally charge) the electronic device. In some other embodiments, if a normal charge voltage of the electronic device 2 is, for example, 5 V, and the control unit 13 acquires, via the handshaking, that the bearable charge voltage of the electronic device 2 is more than 5 V (for example, 9 V), the second control signal CS2 may enable the switch selection unit 14 to output the first voltage V1 (for example, 9 V) more than 5 V to the electronic device 2, to fast charge the electronic device 2. Hereof, the first voltage V1 for fast charge may be determined according to a requirement or a bearable voltage value of the electronic device 2, and is not limited to the above 9 V.

It should be particularly noted that a power delivery pin of the USB Type-C connector is a single pin, so that only the electronic device 2 charging the electronic device 1 or the electronic device 1 charging the electronic device 2 is available. Therefore, when the first control signal CS1 output by the control unit 13 enables the switch unit 11 to output the supply voltage Vin, the second control signal CS2 output by the control unit 13 disables the switch selection unit 14 to not output any voltage to the electronic device 2, or on the contrary, when the first control signal CS1 output by the control unit 13 disables the switch unit 11 to not output the supply voltage Vin, the second control signal CS2 output by the control unit 13 may enable the switch selection unit 14 to output the first voltage V1 or the second voltage V2 to supply power to the electronic device 2, which depends on the actual situation of power supply handshaking.

It is worth mentioning that a withstand voltage value of the switch selection unit 14 of the embodiment needs to be greater than or equal to any voltage value within the voltage varying range of the supply voltage Vin (for example, the voltage to be withstood is 20 V or more than 20 V, such as 30 V). This is because that: in actual application, a line output by the switch unit 11 and a line for outputting the first voltage V1 of the charge conversion unit 12 are connected together, so the supply voltage Vin output by the switch unit 11 also may be transmitted to the switch selection unit 14 during charging for the electronic device 1. Therefore, the switch selection unit 14 needs to be the same as the switch unit 11 to withstand a relatively high DC voltage (the withstand voltage at least needs to be equal to the supply voltage Vin). In addition, the withstand voltage value of the switch selection unit 14 also needs to be greater than or equal to the first voltage V1 and the second voltage V2. Therefore, both of the switch selection unit 14 and the switch unit 11 need to withstand a relatively high DC voltage to avoid burnout caused by relatively high supply voltage Vin, or first voltage V1, or second voltage V2. Moreover, in addition to the above power delivery function, the control unit 13 of the electronic device 1 of the embodiment also may simultaneously support USB 3.1 gen2 and a display signal delivery function of a display port (DP).

Based on the above, the electronic device 1 of the embodiment is coupled to the electronic device 2 through the USB Type-C connecting wire 3 and the USB Type-C connector, and may further receive, in addition to delivering data and signals to the electronic device 2, the non-specific supply voltage Vin transmitted by the electronic device 2 and convert the supply voltage Vin into the DC target voltage Vt for the use by the system. Therefore, compared with the conventional electronic device with the USB Type-C connector, the electronic device 1 of the embodiment is not limited to specific values such as 5 V or 20 V only specified by the Type-C standard specification, and thus is relatively high in applicability and application flexibility and meets the future usage requirements. In addition, in some embodiments, the electronic device 1 may perform the general charge function on the electronic device 2 at the relatively low normal charge voltage: the second voltage V2, or charge the electronic device 2 at the relatively high fast charge voltage: the first voltage V1 to achieve the fast charge purpose.

Figure 2:
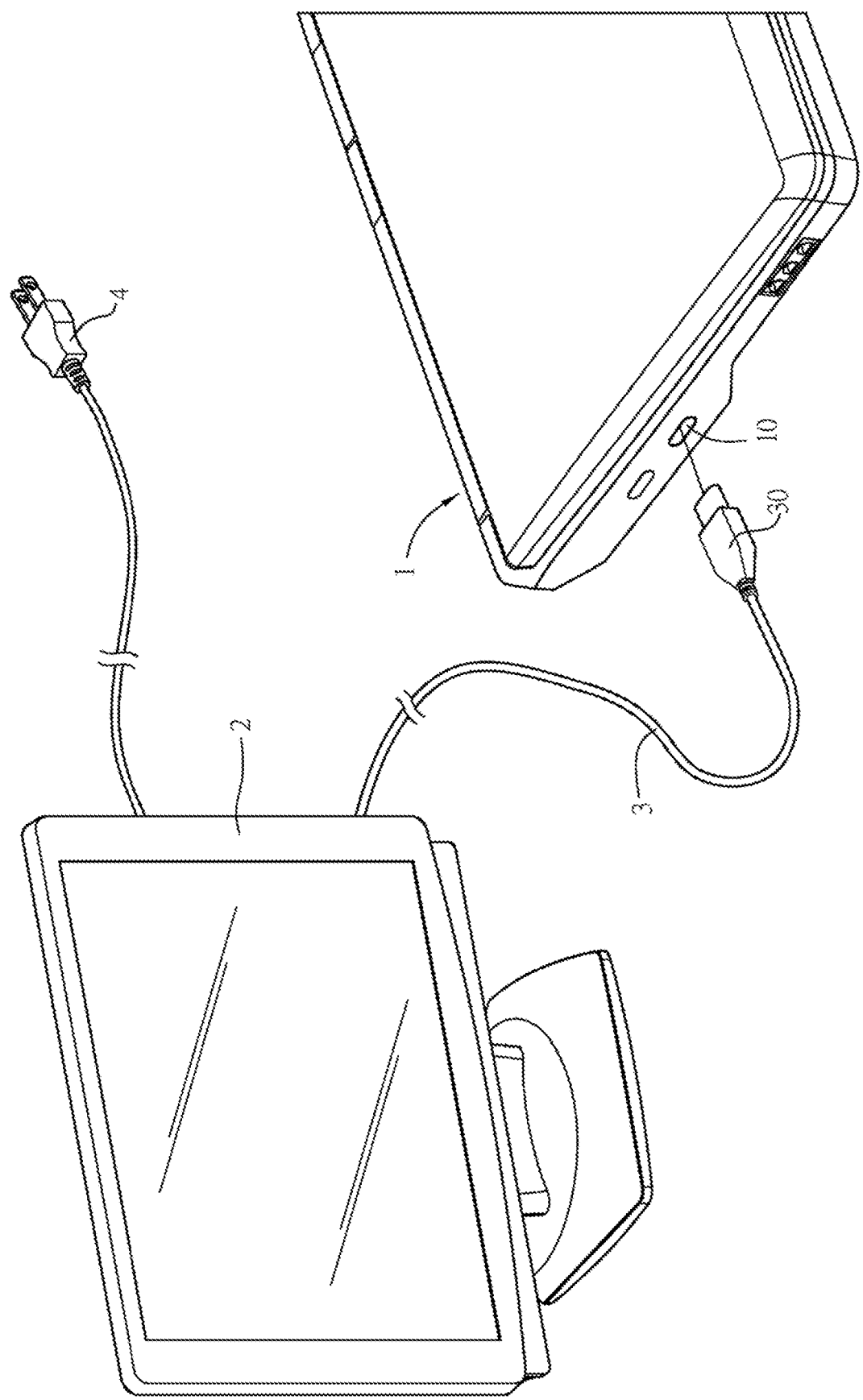
FIG. 2 is a schematic diagram of one embodiment of connection between an electronic device with a USB Type-C connector of the application and another electronic device.

FIG. 2 is a schematic diagram of one embodiment of connection between an electronic device with a USB Type-C connector of the application and another electronic device. As shown in FIG. 2, an electronic device 1 of the embodiment is, for example, a notebook computer with a USB Type-C connector, and an electronic device 2 is, for example, a display screen with a USB Type-C connector. The two electronic devices are connected to each other through a (USB Type-C) connecting wire 3. Two ends of the connecting wire 3 may each have a USB Type-C male connector 30 (the male connector for connecting the electronic device 2 is not shown in FIG. 2), and the two male connectors 30 may be correspondingly connected to USB Type-C female connectors 10 (the female connector of the electronic device 2 is not shown in FIG. 2) of the electronic devices 1, 2 so as to deliver signals or power. Moreover, the electronic device 2 also has a power plug 4 connected to a mains supply, so as to supply desired power to the electronic device 2.

In the embodiment, in addition to that the electronic device 1 provides a display signal by one connecting wire 3 to make the electronic device 2 perform a display function, the electronic device 2 also may provide a target voltage Vt desired by the electronic device 1 by the same connecting wire 3, so as to charge the electronic device 1 (notebook computer).

Therefore, the electronic device 2 is a power consumer and also a power supplier (which supplies power to the electronic device 1). Therefore, the electronic device 2 may charge the electronic device 1 while display data delivery is allowed between the electronic devices 1, 2, saving of time and convenience are achieved, and the use efficiency may be also improved. Furthermore, the electronic device 1 also may not use a traditional power wire, thus unifying wires.

Figure 3:
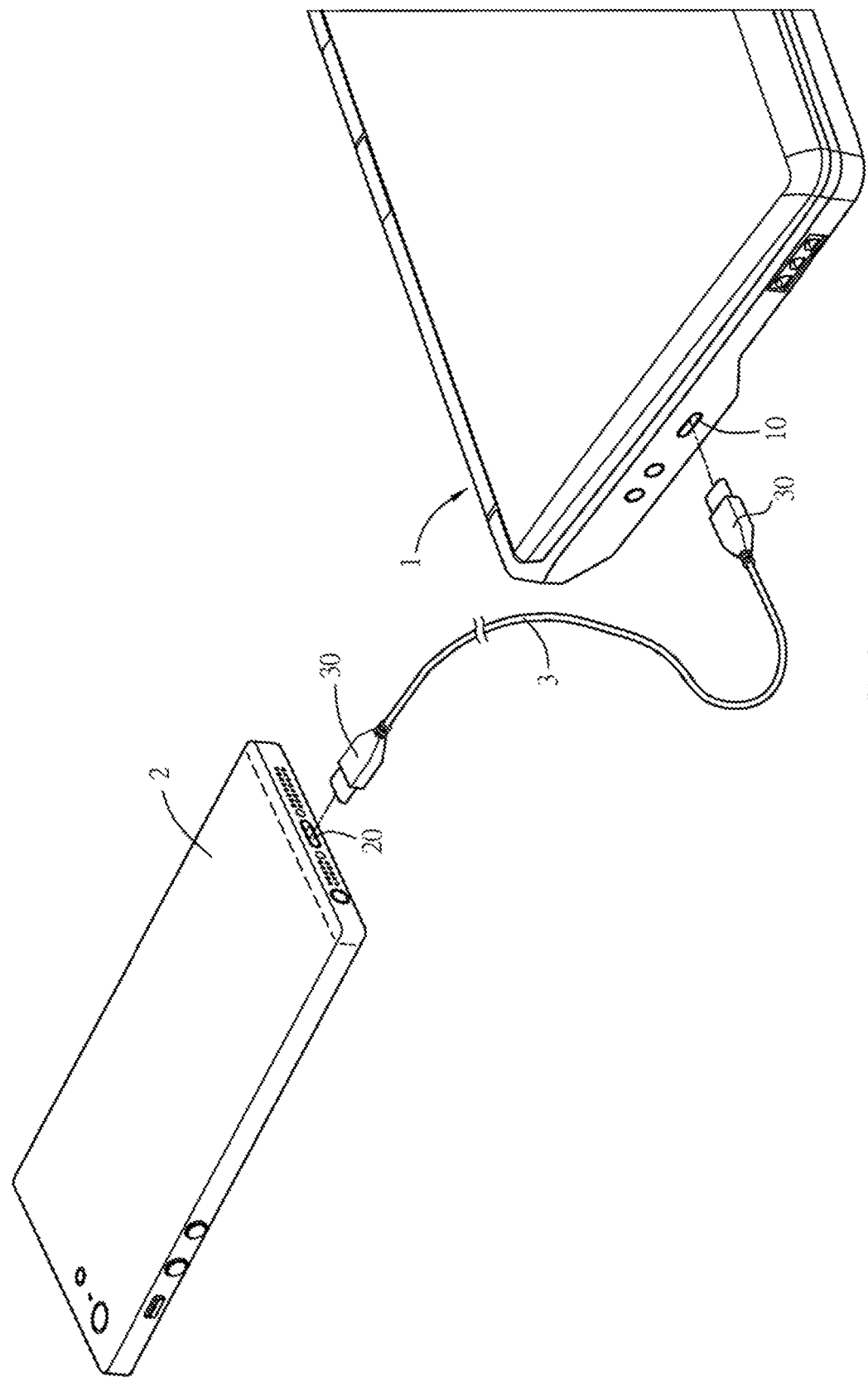
FIG. 3 is a schematic diagram of another embodiment of connection between an electronic device with a USB Type-C connector of the application and another electronic device.

FIG. 3 is a schematic diagram of another embodiment of connection between an electronic device with a USB Type-C connector of the application to another electronic device. As shown in FIG. 3, an electronic device 1 of the embodiment is, for example, a notebook computer with a USB Type-C connector, and an electronic device 2 is, for example, a mobile phone with a USB Type-C connector. The two electronic devices are also connected to each other through a connecting wire 3. In the embodiment, in addition to that a data delivery function is performed between the electronic devices 1, 2 by one connecting wire 3, the electronic device 1 also may supply power to the electronic device 2 by the same connecting wire 3, so as to charge the electronic device 2. Therefore, the electronic device 1 may be a power receiver and also a power supplier (which supplies power to the electronic device 2). The voltage supplied by the electronic device 1 may be a first voltage V1 (for fast charge) or a second voltage V2 (for general charge), which depends on a requirement and a specification of the electronic device 2. Therefore, the electronic device 2 may be charged while data delivery is allowed between the electronic devices 1, 2, saving of time and convenience are achieved, and the use efficiency may be also improved. Furthermore, the electronic device 2 also may not use a traditional power wire, thus unifying wires.

Moreover, it is also worth mentioning that if the electronic device 1 is, for example, a notebook computer, when two identical electronic devices 1 (notebook computers) are connected to each other by the connecting wire 3, the electronic devices 1 may have a mutual charge function that cannot be realized by the conventional notebook computer (the existing two notebook computers with the USB Type-C connectors do not support the mutual charge function).

In conclusion, in addition to the data and signal delivery with the other electronic device, the electronic device with the USB C-type connector of the application also may receive a non-specific supply voltage transmitted by the other electronic device according to the result of handshaking and convert the non-specific supply voltage into a desired target voltage value for power delivery for the use by the system of the electronic device.

Therefore, compared with the conventional electronic device with the USB Type-C connector, the electronic device of the application is not limited to certain specific voltage values, and thus is relatively high in applicability and application flexibility and meets the future usage requirements.

In some embodiments, the electronic device of the application may perform a general charge function on the other electronic device at a relatively low second voltage, or charge the other electronic device at a relatively high first voltage, so as to achieve a fast charge purpose.

The foregoing contents are only exemplary, but not restrictive. Any equivalent modifications or changes that are made to the application without departing from the spirit and scope of the application shall fall within the appended claims.

What is claimed is:

1. An electronic device with a USB Type-C connector, which is able to be coupled to another electronic device with a USB Type-C connector, wherein the electronic device comprises:
   a control unit, outputting a first control signal according to a result of power supply handshaking between the electronic device and the other electronic device, wherein the state of the first control signal determines whether the other electronic device supplies power to the electronic device;
   a switch unit, coupled to the control unit, wherein the switch unit receives a supply voltage output by the other electronic device, the switch unit determines whether to output the supply voltage according to the state of the first control signal, and the switch unit outputs the supply voltage when the state of the first control signal is enabling the switch unit;
   a charge conversion unit, coupled to the switch unit, wherein the charge conversion unit converts the supply voltage into a target voltage to supply power to the electronic device;
   a system power unit, coupled to the charge conversion unit, wherein when the other electronic device supplies power to the electronic device, the target voltage is transmitted to the system power unit; and
   a switch selection unit, coupled to the charge conversion unit and the control unit, wherein the control unit further outputs a second control signal according to the result of power supply handshaking between the electronic device and the other electronic device; the state of the second control signal determines whether the electronic device supplies power to the other electronic device; the system power unit is able to provide a first voltage; and the charge conversion unit outputs the first voltage to the switch selection unit,
   wherein the system power unit is able to provide a second voltage to the switch selection unit, and when the electronic device acquires, according to the result of power supply handshaking, information that the other electronic device may receive power, the state of the second control signal output by the control unit is enabling the switch selection unit, so that the switch selection unit outputs the first voltage or the second voltage according to the second control signal to supply power to the other electronic device.

2. The electronic device according to claim 1, wherein the control unit receives a power delivery packet output by the other electronic device to determine the result of power supply handshaking.

3. The electronic device according to claim 1, wherein when the electronic device acquires, according to the result of power supply handshaking, information that the other electronic device is unable to supply power, the state of the first control signal output by the control unit is disabling the switch unit, so that the switch unit is unable to output the supply voltage to the charge conversion unit.

4. The electronic device according to claim 1, wherein a withstand voltage value of the switch selection unit is greater than or equal to the supply voltage.

5. The electronic device according to claim 1, wherein when the electronic device acquires, according to the result of power supply handshaking, information that the other electronic device is unable to receive power, the state of the second control signal output by the control unit is disabling the switch selection unit, so that the switch selection unit does not output a voltage and not supply power to the other electronic device according to the second control signal.

6. The electronic device according to claim 1, wherein a withstand voltage value of the switch selection unit is greater than or equal to the first voltage and the second voltage.

7. The electronic device according to claim 1, wherein the first voltage is greater than the second voltage, the first voltage is a fast charge voltage, obtained by the power supply handshaking between the electronic device and the other electronic device, of the other electronic device, and the second voltage is a normal charge voltage of the other electronic device.

8. The electronic device according to claim 1, wherein when the state of the first control signal is enabling the switch unit to output the supply voltage, the state of the second control signal is disabling the switch selection unit, so as not to output a voltage and supply power to the other electronic device.

9. The electronic device according to claim 1, wherein the supply voltage is any voltage value in a range from 5 V to 20 V.

* * * * *